Aug. 2, 1966     D. C. DICKSON, JR     3,264,531
RECTIFIER ASSEMBLY COMPRISING SERIES STACKED
P N-JUNCTION RECTIFIERS
Filed March 29, 1962

INVENTOR.
DONALD C. DICKSON, JR.
BY John J. McLaughlin
atty.

United States Patent Office 3,264,531
Patented August 2, 1966

3,264,531
RECTIFIER ASSEMBLY COMPRISING SERIES
STACKED PN-JUNCTION RECTIFIERS
Donald C. Dickson, Jr., 4932 E. Calle del Norte,
Phoenix, Ariz.
Filed Mar. 29, 1962, Ser. No. 183,451
9 Claims. (Cl. 317—234)

My invention relates to an improved high voltage rectifying assembly, and more in particular to a relatively high voltage rectifying unit comprising a plurality of series-connected rectifying semiconductor diodes.

It is known that a plurality of semiconductor rectifying diodes may be series-connected to rectify relatively high voltages. It has also been a practice to connect such diodes into an electrical network of resistors and/or capacitors to stabilize the circuit and divide the voltage relatively uniformly among the several diodes.

Thus, looking at FIG. 6 of the drawings, if one should wish to rectify a voltage of 3000 volts at peak condition, six voltage rectifying diodes, each rated at 500 volts, could be connected in series as shown in this figure. At the same time a resistor and/or capacitor would be connected across each rectifier in the manner shown. The resistors R function to divide low frequency components of the total voltage evenly across each rectifying diode. The capacitors C function to divide the higher frequency components of the total voltage equally across each rectifier. The resulting network, including the six resistors and six capacitors, one for each rectifying diode, may be considered as a frequency compensated voltage divider, and the complete circuit, including the series-connected diodes, produces a satisfactory rectifying action. There are several disadvantages of the arrangement, however, including the over-all space requirements and the material costs of the added parts and labor cost of making all of the required connections.

The principal object of the present invention is the provision of improved means for rectifying relatively high voltage.

Another object is the provision of a unit rectifier for relatively high voltages employing a plurality of rectifying diodes.

Still another object of the invention is the provision of improved means at reduced cost for the frequency compensation of a group of series-connected diodes.

Other specific objects and features of the invention will be apparent from the following specification taken with the accompanying drawings, wherein.

Referring now first again to FIG. 6, it is known to utilize a circuit in which a plurality of rectifying diodes D are series-connected to provide for higher voltage rectifying capacity, and connect the said series into a network including the resistors R and capacitors C in the general manner shown. Thus, six 500-volt rectifiers, for example, may be series-connected to rectify a peak voltage of 3000 volts, and the RC network functions as a frequency compensated voltage divider. The total voltage impressed across the system is divided substantially equally across the six diodes. While this type of assembly may be constructed to produce functionally impressive results, it has several disadvantages as already pointed out, and in general represents an unwieldly circuitry unit.

Figure 6:
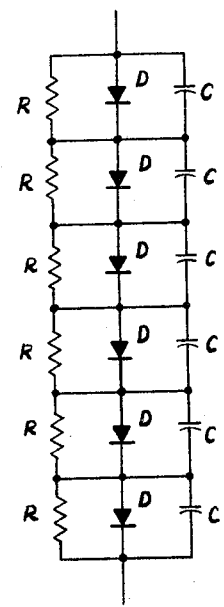
FIG. 6 illustrates a relatively high voltage rectifier unit with a frequency compensated voltage divider in accordance with the prior art.

My present invention obtains all of the advantages of the FIG. 6 assembly and avoids most if not all of its disadvantages in a simple, direct manner. It produces a structurally compact, functionally effective, relatively high voltage rectifier of which the sectional view shown in FIG. 1 is illustrative.

Figure 1:
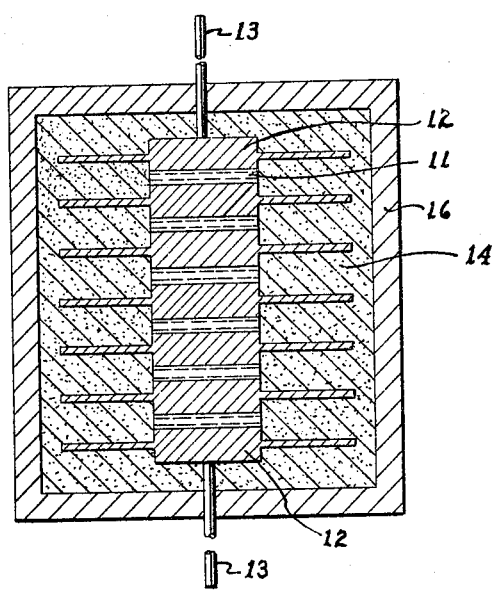
FIG. 1 is an enlarged vertical sectional view showing one embodiment of the high voltage rectifier assembly of the present invention.

As illustrated in FIG. 1, a plurality of individual rectifying diodes 11 are secured between a plurality of larger diameter disks indicated generally by the reference character 12. There is a disk 12 on either side of each diode 11, making one more disk than diodes, and providing top and bottom connections for attachment of terminal wires 13. The entire stack of diodes 11 and disks 12 are suitably soldered together, and the resulting integral structure is enclosed within a body of a specially selected and compounded material 14 which supplies to the assembly the equivalent electrical and dielectric properties normally provided by the network of resistors and capacitors employed in FIG. 6. The material 14 closely engages the entire assembly of diodes 11 and disks 12, and this assembly is then encapsulated in a protective envelope 16 of relatively very high dielectric material.

Illustrative of a material which may be employed for direct contact with the diode and disk assembly is a mixture of an epoxy resin and approximately fifty percent by weight of high dielectric constant barium titanate material and a proportion of amorphous carbon, such as lamp black or graphite, dispersed therein. The barium titanate and carbon are uniformly dispersed in the epoxy resin to produce a material 14 comprising a cured epoxy resin mixture with a resistivity of the order of $10^7$ to $10^9$ ohm-cm. Suitably the total resistance between successive disks may be, for example, of the order of one megohm. The barium titanate dielectric between the metal disks constitutes a capacitor, and the carbon provides a high resistivity conduction path performing a function similar to that of the resistors in the described FIG. 6 network of the prior art. The envelope 16 may be, for example, epoxy resin having a resistivity, for example, of the order of $10^{14}$ ohm.-cm.

Figure 2:
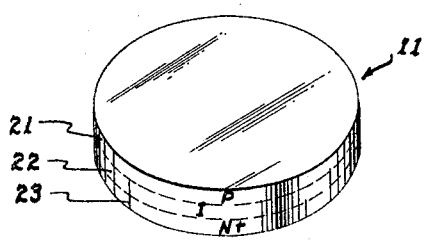
FIG. 2 is a fragmentary isometric view on an enlarged scale showing a semiconductor element of the type used to form the stack of diodes used in the FIG. 1 embodiment.

There is considerable latitude in the production of the diodes used in the present invention. Illustratively, the diodes used in the present invention are formed by producing a doped crystal according to common practice and cutting the same to the form of dies having, for example, fifty to five hundred ohm-cm. resistivity. By then diffusing boron or other acceptor material into one side of the die and phosphorus or other donor material into the opposite side, a rectifying diode may be formed having a P layer 21 (see FIG. 2), an I layer 22 comprising the original doped material, and an N+ layer 23.

I may prepare a rectifying diode for my present purpose in accordance with the disclosure of my prior co-pending application, S.N. 139,110, filed September 19, 1961 and entitled "P-I-N Semiconductor with Improved Breakdown Voltage." When a unitary device of the present type employs diodes such as disclosed in such co-pending application, distribution of low frequency components among the several diodes may be adequately accomplished by careful control and equalization of the annular conductive film and there may be no requirement to employ carbon o equivalent higher conductivity material as part of the material 14 surrounding the diode-disk assembly.

Figure 5:
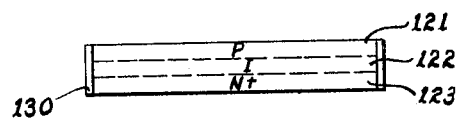
FIG. 5 is an enlarged sectional view showing one way in which the diodes used in the present invention may be produced.

FIG. 5 is illustrative of a modified P-I-N junction diode of the type disclosed in my co-pending application in which there are a P layer 121, I layer 122 and an N+ layer 123, with a substantially uniform shunting cylindrical layer 130 of relatively lower resistivity material as described in my said co-pending application.

Figure 3:
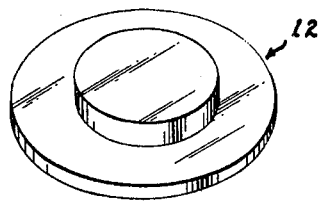
FIG. 3 is a perspective view showing one form of diode separating disc used in assembling the stack of diodes characteristic of the FIG. 1 embodiment.
Figure 4:
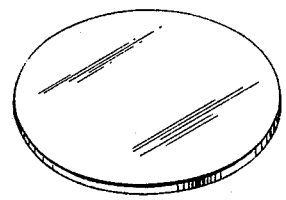
FIG. 4 is a view similar to FIG. 3 showing a modified separating disc structure.

The disks 12 may be made in various ways and of various materials. Silver or silver-surfaced copper are illustrative of suitable materials, and they may be of a thickness of only a few mils with a somewhat thickened center portion where they contact the semiconductor element as shown in FIG. 3. They may, however, be of uniform thickness as shown in FIG. 4, but care must then be exerted to assure complete filling of the space between them to secure the desired capacity effect.

There are various ways in which the characteristics of the material 14 may be controlled, and, of course, the specific characteristics required must be determined in part at least by the properties and characteristics of the specific rectifying diodes employed. Proper selection of the basic material to obtain suitable dielectric properties is one approach where temperature sensitivity is not significant, such as in the case with many plastics. In general, it is preferred to employ a material like an epoxy resin and then to modify it by the use of finely divided barium titanate or other suitable ceramic refractory or the like high dielectric material of which large numbers are available and their properties listed in many reference books. A large proportion of barium titanate, $BaTiO_3$, or other refractory may be used both to reduce the coefficient of expansion of the epoxy or other resin and to provide the desired capacitance between the disks. Combinations, such as of barium titanate and powdered quartz, for example, may be selected with the desired dielectric constant for a given requirement, having in mind control of the physical properties of the basic material and the capacitance of the completed device. So, also, carbon black is merely illustrative of a material used to control conductivity characteristics of the mixed material 14, as may other powdered materials, mixtures and treatments are available for use in place of carbon black in the mixture.

The invention is not limited by details shown and described, but the scope of the invention is defined by the claims.

I claim:

1. A high voltage rectifier assembly comprising:
 (a) a plurality of semiconductor rectifying diodes,
 (b) a plurality of disks of greater diameter than said diodes with one such disk in electrical contact with each side of each diode and all of the disks projecting radially from the diodes, all of said diodes and disks in mutual contact to form a stack of series-connected diodes, and said disks being thicker in that area in contact with said rectifying diodes than in said radially projecting area,
 (c) a material completely surrounding said stack, said material comprising a resin having a relatively low dielectric constant and very high resistivity of the order $10^{14}$ ohms/cm., said resin having dispersed therein a proportion of relatively high dielectric constant material and a finely divided conducting material, said finely conducting material functioning to reduce the resistivity of the said material to the order of $10^7$ to $10^9$ ohm-cm.

2. A high voltage rectifier assembly comprising:
 (a) a plurality of semiconductor rectifying diodes,
 (b) a plurality of disks of greater diameter than said diodes with one such disk in electrical contact with each side of each diode and all of the disks projecting radially from the diodes, all of said diodes and disks in mutual contact to form a stack of series-connected diodes, and (c) a material completely surrounding said stack, said material comprising a resin with a relatively low dielectric constant and very high resistivity having dispersed therein a proportion of relatively high dielectric constant powdered barium titanate and a proportion of powdered carbon.

3. A high voltage rectifier assembly comprising:
 (a) a plurality of semiconductor rectifying diodes,
 (b) a plurality of disks of greater diameter than said diodes with one such disk in electrical contact with each side of each diode and all of the disks projecting radially from the diodes, all of said diodes and disks in mutual contact to form a stack of series-connected diodes,
 (c) a material completely surrounding said stack, said material comprising a resin with a relatively low dielectric constant and very high resistivity having dispersed therein a proportion of relatively high dielectric constant powdered barium titanate and a proportion of powdered carbon, and
 (d) an outer envelope of plastic material having a relatively low dielectric constant and high resistivity.

4. A high voltage rectifier assembly comprising:
 (a) a plurality of semiconductor diodes, each having a P-N rectifying junction,
 (b) a plurality of spacing plates separating said diodes, said spacing plates having a relatively thicker portion with an area approximately equal to the diode area, and a relatively thinner peripherally projecting portion,
 (c) said diodes and plates being secured together in ohmic contact relation forming an integral unitary rectifying stack of plates and diodes providing a plurality of uniformly spaced surfaces at opposite faces of said individual rectifying diodes,
 (d) a low dielectric plastic material disposed between said surfaces and surrounding said stack,
 (e) a plurality of finely divided particles of high resistivity refractory material uniformly dispersed in said low dielectric plastic material providing increased capacitance between said surfaces, and
 (f) a plurality of finely divided relatively low conductivity particles uniformly dispersed in said plastic material between said surfaces.

5. A high voltage rectifier assembly comprising:
 (a) a plurality of semiconductor diodes, each having a P-N rectifying junction,
 (b) a plurality of spacing plates separating said diodes,
 (c) said diodes and plates being secured together in ohmic contact relation forming an integral unitary rectifying stack of plates and diodes providing a plurality of uniformly spaced surfaces at opposite faces of said individual rectifying diodes,
 (d) a low dielectric plastic material disposed between said surfaces and surrounding said stack,
 (e) a plurality of finely divided particles of barium titanate dispersed substantially uniformly in said plastic between said surfaces, and
 (f) a proportion of finely divided carbon particles dispersed substantially uniformly within said plastic between said surfaces.

6. A high voltage rectifier assembly comprising:
 (a) a plurality of semiconductor diodes, each having a P-N rectifying junction,
 (b) a plurality of spacing plates separating said diodes,
 (c) said diodes and plates being secured together in ohmic contact relation forming an integral unitary rectifying stack of plates and diodes providing a plurality of uniformly spaced surfaces at opposite faces of said individual rectifying diodes,
 (d) an epoxy resin mixture disposed between said surfaces and surrounding said stack, said epoxy resin mixture having a resistivity of the order of $10^7$ to $10^9$ ohm-cm., (e) a plurality of finely divided particles of barium titanate substantially uniformly dispersed within said epoxy resin between said surfaces, and
(f) a plurality of finely divided carbon particles substantially uniformly dispersed within said epoxy resin between said surfaces.

7. A high voltage rectifier assembly comprising:
(a) a plurality of semiconductor diodes, each having a P-N rectifying junction,
(b) a plurality of spacing plates separating said diodes,
(c) said diodes and plates being secured together in ohmic contact relation forming an integral unitary rectifying stack of plates and diodes providing a plurality of uniformly spaced surfaces at opposite faces of said individual rectifying diodes,
(d) an epoxy resin mixture disposed between said surfaces and surrounding said stack, said epoxy resin mixture having a resistivity of the order of $10^7$ to $10^9$ ohm-cm.,
(e) a plurality of finely divided particles of barium titanate substantially uniformly dispersed within said epoxy resin between said surfaces,
(f) a plurality of finely divided carbon particles substantially uniformly dispersed within said epoxy resin between said surfaces, and
(g) an outer envelope of an epoxy resin having a resistivity of the order of $10^{14}$ ohm-cm.

8. A high voltage rectifier assembly comprising:
(a) a plurality of semiconductor diodes, each having a P-N recifying junction,
(b) a plurality of plates of greater area than said diodes disposed between successive diodes, and at each end of the resulting stack, said plates and diodes being mutually attached in ohmic relation to produce a single rectifying unit in the form of said stack, said plates having a relatively thicker portion in contact with the diodes and a relatively thinner portion projecting peripherally from said diodes,
(c) an epoxy resin having a resistivity of the order of $10^7$ to $10^9$ ohm-cm. disposed between projecting portions of said plates and encompassing said stack, a plurality of relatively low dielectric high resistivity particles substantially uniformly dispersed in said epoxy resin between said plates, a plurality of relatively low conductivity finely divided particles substantially uniformly dispersed in said epoxy resin between said plates, and
(d) an outer envelope of an epoxy resin having a resistivity of the order of $10^{14}$ ohm-cm.

9. A high voltage rectifier assembly comprising:
(a) a plurality of semiconductor elements having P, I and N layers forming a rectifying junction,
(b) a plurality of spacing plates of greater area than said semiconductor elements,
(c) said plates having relatively high conductivity and being secured in contact with and between and at ends of said semiconductor elements to form a unitary rectifying stack with portions of said plates projecting in parallel relation beyond edges of said individual P-I-N junctions facing spaces extending beyond the semiconductor junctions edge, said plates being substantially thicker in that portion thereof in contact with the semiconductor elements that in that portion projecting beyond the edges of the semiconductor elements,
(d) a shunting conductive layer bridging each individual P-I-N junction, the conductivity of which layer is relatively higher under normal operating conditions than the semiconductor junction itself,
(e) a plastic material entirely surrounding said stack and substantially filling said spaces, and
(f) a finely divided dielectric refractory material substantially uniformly dispersed in said plastic material.

References Cited by the Examiner

UNITED STATES PATENTS

| | | | |
|---|---|---|---|
| 2,414,801 | 1/1947 | Clarke | 317—234 |
| 2,702,360 | 2/1955 | Giacoletto | 317—234 |
| 2,883,592 | 4/1959 | Burton et al. | 317—234 |
| 2,918,612 | 12/1959 | Parrish | 317—234 |
| 2,967,984 | 1/1961 | Jamison | 317—234 |

JOHN W. HUCKERT, *Primary Examiner.*

DAVID J. GALVIN, *Examiner.*

J. D. KALLAM, J. A. ATKINS, *Assistant Examiners.*